United States Patent Office 3,819,661
Patented June 25, 1974

---

3,819,661
2-CHLORO-N-FURFURYL OR TETRAHYDROFUR-
FURYLACETANILIDES AND RING SUBSTI-
TUTED DERIVATIVES
Lester L. Maravetz, Westfield, N.J., assignor to
Mobil Oil Corporation
No Drawing. Filed Nov. 1, 1971, Ser. No. 194,521
Int. Cl. C07d 5/16
U.S. Cl. 260—347.3                    6 Claims

ABSTRACT OF THE DISCLOSURE

There are provided compounds having the formulae:

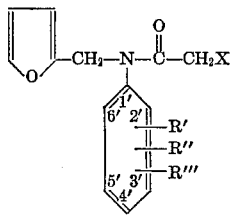

and the corresponding N-tetrahydrofurfuryl compounds, wherein X is halogen (Cl or Br) and R', R" and R''' are $C_1$–$C_6$ alkyl, $C_1$–$C_6$ alkoxy, $C_1$–$C_6$ alkylthio, $C_1$–$C_6$ alkylsulfinyl, $C_1$–$C_6$ alkylsulfonyl, halo cyano, $C_1$–$C_3$ alkoxycarbonyl, acetoxy, acetyl, and trifluoromethyl. These compounds are useful as pre-emergence herbicides.

BACKGROUND OF THE INVENTION

Field of the Invention

This invention is directed to 2-chloroacetanilides having an N-furfuryl or tetrahydrofurfuryl constituent.

Description of the Prior Art

In U.S. Pat. No. 3,547,620 there are disclosed certain N-furfuryloxymethyl and N-tetrahydrofurfuryloxymethyl-alpha-haloacetanilides having herbicidal properties. Insofar as is now known the present compounds which do not contain the oxymethyl group have not been disclosed.

SUMMARY OF THE INVENTION

There are provided compounds having the formulae:

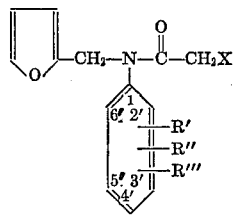

and the corresponding N-tetrahydrofurfuryl compounds, wherein X is halogen (Cl or Br) and R', R", and R''' are $C_1$–$C_6$ alkyl, $C_1$–$C_6$ alkoxy, $C_1$–$C_6$ alkylthio, $C_1$–$C_6$ alkylsulfinyl, $C_1$–$C_6$ alkylsulfonyl, halo, cyano, $C_1$–$C_3$ alkoxycarbonyl, acetyl, and trifluoromethyl.

There are also provided compositions of these compounds on a carrier and the method of their use for pre-emergence herbicides.

DESCRIPTION OF SPECIFIC EMBODIMENTS

The compounds of this invention are chloroacetanilides having an N-furfuryl or N-tetrahydrofurfuryl substituent and ring-substituted derivatives as set forth in the structural formulae hereinbefore. Non-limiting examples of the compounds of this invention are:

2-Chloro-N-furfurylacetanilide
2-Bromo-N-furfurylacetanilide
2-Chloro-N-tetrahydrofurfurylacetanilide
2-Bromo-N-tetrahydrofurfurylacetanilide
2-Chloro-N-furfuryl-2'-acetylacetanilide
2-Chloro-N-tetrahydrofurfuryl-3'-acetylacetanilide
2-Chloro-N-furfuryl-2'-bromoacetanilide
2-Chloro-N-tetrahydrofurfuryl-2'-bromoacetanilide
2-Bromo-N-furfuryl-2',6'-dimethylacetanilide
2-Chloro-N-tetrahydrofurfuryl-4'-bromoacetanilide
2-Chloro-N-furfuryl-2'-t-butylacetanilide
2-Chloro-N-tetrahydrofurfuryl-2'-t-butylacetanilide
2-Chloro-N-furfuryl-2'-chloroacetanilide
2-Chloro-N-tetrahydrofurfuryl-2'-chloroacetanilide
2-Chloro-N-furfuryl-4'-chloroacetanilide
2-Chloro-N-tetrahydrofurfuryl-2',6'-dibromoacetanilide
2-Chloro-N-furfuryl-2',3'-dichloroacetanilide
2-Chloro-N-tetrahydrofurfuryl-2',4'-dichloroacetanilide
2-Chloro-N-furfuryl-2',5'-dichloroacetanilide
2-Chloro-N-tetrahydrofurfuryl-3',4'-dichloroactanilide
2-Chloro-N-furfuryl-3',4'-dichloroacetanilide
2-Chloro-N-tetrahydrofurfuryl-2',6'-dichloroacetanilide
2-Chloro-N-furfuryl-2',3'-dimethylacetanilide
2-Chloro-N-tetrahydrofurfuryl-2',4'-dimethylacetanilide
2-Chloro-N-furfuryl-2',5'-dimethylacetanilide
2-Chloro-N-tetrahydrofurfuryl-2',6'-dimethylacetanilide
2-Chloro-N-furfuryl-2',6'-dimethylacetanilide
2-Chloro-N-tetrahydrofurfuryl-3',4'-dimethylacetanilide
2-Chloro-N-furfuryl-3',5'-dimethylacetanilide
2-Chloro-N-tetrahydrofurfuryl-3'-ethoxyacetanilide
2-Chloro-N-furfuryl-4'-ethoxyacetanilide
2-Chloro-N-tetrahydrofurfuryl-2'-ethylacetanilide
2-Chloro-N-furfuryl-3'-ethylacetanilide
2-Chloro-N-tetrahydrofurfuryl-4'-ethylacetanilide
2-Chloro-N-furfuryl-2'-iodoacetanilide
2-Chloro-N-tetrahydrofurfuryl-3'-iodoacetanilide
2-Chloro-N-furfuryl-4'-iodoacetanilide
2-Chloro-N-tetrahydrofurfuryl-2'-isopropylacetanilide
2-Chloro-N-furfuryl-4'-isopropylacetanilide
2-Chloro-N-tetrahydrofurfuryl-2'-isopropyl-5'-methylacetanilide
2-Chloro-N-furfuryl-2'-methoxyacetanilide
2-Chloro-N-tetrahydrofurfuryl-3'-methoxyacetanilide
2-Chloro-N-furfuryl-4'-methoxyacetanilide
2-Chloro-N-tetrahydrofurfuryl-2'-methylacetanilide
2-Chloro-N-furfuryl-3'-methylacetanilide
2-Chloro-N-furfuryl-2'-propylacetanilide
2-Chloro-N-tetrahydrofurfuryl-4'-propylacetanilide
2-Chloro-N-furfuryl-2',4',6'-tribromoacetanilide
2-Chloro-N-tetrahydrofurfuryl-3',4',5'-tribromoacetanilide
2-Chloro-N-furfuryl-2',3',4'-trichloroacetanilide
2-Chloro-N-tetrahydrofurfuryl-2',4',5'-trichloroacetanilide
2-Chloro-N-furfuryl-2',4',6'-trichloroacetanilide
2-Chloro-N-tetrahydrofurfuryl-2',4',5'-trimethylacetanilide
2-Chloro-N-furfuryl-2',4',6'-trimethylacetanilide
2-Chloro-N-furfuryl-2',6'-diethylacetanilide
2-Chloro-N-tetrahydrofurfuryl-3'-isopropylacetanilide
2-Chloro-N-tetrahydrofurfuryl-2'-methylthioacetanilide
2-Chloro-N-furfuryl-2'-methyl-6'-ethylacetanilide
2-Chloro-N-tetrahydrofurfuryl-2'-methyl-4'-methoxyacetanilide
2-Chloro-N-furfuryl-2'-methyl-3'-chloroacetanilide
2-Chloro-N-tetrahydrofurfuryl-2'-methyl-5'-chloroacetanilide
2-Chloro-N-furfuryl-2'-methyl-6'-chloroacetanilide
2-Chloro-N-furfuryl-2'-methyl-5'-chloroacetanilide
2-Chloro-N-tetrahydrofurfuryl-2'-t-butyl-6'-methylacetanilide
2-Chloro-N-furfuryl-3'-trifluoromethylacetanilide
2-Chloro-N-tetrahydrofurfuryl-2',6'-diisopropylacetanilide
2-Chloro-N-furfuryl-2'-ethylacetanilide
2-Chloro-N-furfuryl-2'-isopropylacetanilide
2-Chloro-N-furfuryl-2'-methylthioacetanilide 2-Chloro-N-furfuryl-3',4'-dichloroacetanilide
2-Chloro-N-tetrahydrofurfuryl-2'-methyl-6'-ethylacetanilide
2-Chloro-N-tetrahydrofurfuryl-2'-methoxyacetanilide
2-Chloro-N-furfuryl-2'-methyl-4'-methoxyacetanilide
2-Chloro-N-tetrahydrofurfuryl-2'-methyl-4'-methoxyacetanilide
2-Chloro-N-furfuryl-2'-methyl-4'-chloroacetanilide
2-Chloro-N-tetrahydrofurfuryl-2'-methyl-4'-chloroacetanilide
2-Chloro-N-furfuryl-2',4'-dimethylacetanilide
2-Chloro-N-tetrahydrofurfuryl-2',4'-dimethylacetanilide
2-Chloro-N-tetrahydrofurfuryl-2',4',6'-trimethylacetanilide
2-Chloro-N-furfuryl-2',4',6'-trimethylacetanilide
2-Chloro-N-furfuryl-2'-t-butyl-6'-methylacetanilide
2-Chloro-N-furfuryl-2',6'-diisopropylacetanilide
2-Chloro-N-furfuryl-2'-n-hexylacetanilide
2-Chloro-N-furfuryl-2'-n-hexyloxyacetanilide
2-Chloro-N-tetrahydrofurfuryl-2'-n-hexylthioacetanilide
2-Chloro-N-furfuryl-2'-methylsulfinyl-6'-methylacetanilide
2-Chloro-N-furfuryl-2'-methylsulfonyl-6'-methylacetanilide
2-Chloro-N-furfuryl-2'-acetoxyacetanilide
2-Chloro-N-furfuryl-2'-methyl-5'-cyanoacetanilide
2-Chloro-N-furfuryl-2'-n-propoxycarbonylacetanilide.

The compounds of this invention can be prepared by various procedures. It has been found that the most feasible synthesis involves three basic steps: (1) preparing furfurylidene or aniline or a substituted aniline, (2) converting the furfurylidene to the N-furfuryl or N-tetrahydrofurfurylaniline and (3) converting intermediate to the acetanilide.

The first step involves a conventional reaction of an aldehyde with an amine. In the present case this involves reacting furfural in a condensation reaction with aniline or a substituted aniline. The reaction is most feasibly carried out using a hydrocarbon such as benzene, toluene, or xylene and reflux for the azeotropic removal of water followed by the removal of solvent at reduced pressure to give the product imines. Typical aniline derivatives utilizable herein are as follows:

| | |
|---|---|
| aniline | 4-isopropylaniline |
| 2-acetylaniline | 2-isopropyl-5-methylaniline |
| 2-bromoaniline | 2-methoxyaniline |
| 2-chloroaniline | 3-bromoaniline |
| 3-chloroaniline | 4-bromoaniline |
| 4-chloroaniline | 2-t-butylaniline |
| 2,6-dibromoaniline | 3-methoxyaniline |
| 2,3-dichloroaniline | 4-methoxyaniline |
| 2,4-dichloroaniline | 2-methylaniline |
| 2,5-dichloroaniline | 3-methylaniline |
| 3,4-dichloroaniline | 2-propylaniline |
| 2,6-dichloroaniline | 4-propylaniline |
| 2,3-dimethylaniline | 2,4,6-tribromoaniline |
| 2,4-dimethylaniline | 2,4,6-trimethylaniline |
| 2,5-dimethylaniline | 2,6-diethylaniline |
| 2,6-dimethylaniline | 3-isopropylaniline |
| 3,4-dimethylaniline | 2-methylthioaniline |
| 3,5-dimethylaniline | 2-methyl-6-ethylaniline |
| 3-ethoxyaniline | 2-methyl-4-methoxyaniline |
| 4-ethoxyaniline | 2-methyl-3-chloroaniline |
| 2-ethylaniline | 2-methyl-4-chloroaniline |
| 3-ethylaniline | 2-methyl-6-chloroaniline |
| 4-ethylaniline | 2-t-butyl-6-methylaniline |
| 2-iodoaniline | 2-trifluoromethylaniline |
| 3-iodoaniline | 2,6-diisopropylaniline |
| 4-iodoaniline | 2-methyl-5-cyanoaniline |
| 2-isopropylaniline | n-propyl anthranilate |

The following examples illustrate typical synthesis techniques.

EXAMPLE 1

N-Furfurylidene-o-toluidine

A flask was equipped with condenser, stirrer, and a Dean-Stark trap. Furfural (54.8 g., 0.56 mole) in 100 ml. of benzene was added dropwise in 20 minutes to the flask containing o-toluidine (53.6 g., 0.5 mole) in 300 ml. of benzene. No exotherm was noted and the stirred solution was refluxed overnight. By this time about 8.5 ml. of water had collected in the Dean-Stark trap. The solvent was removed under reduced pressure and the crude residual oil upon chilling solidified (93 g.). The solid was dissolved in hot heptane, treated with Norite, and the hot solution upon filtration deposited tan granular solids (78 g.), m.p. 56–8° C.

NMR (CDCl$_3$), δ 1.9 (3H, s, CH$_3$), 6.46 (1H, q, γ-H), 6.8–7.25 (5H, m, Ar-H's and β-H), 7.52 (1H, d, δ-H), 8.1 (1H, s, C$\underline{\text{H}}$=N).

EXAMPLE 2

N-Furfurylidene-2,6-dimethylaniline

A flask was charged with 2,6-dimethylaniline (200 g., 1.65 mole) and concentrated sulfuric acid (12 drops) in one liter of toluene. To this stirred solution was added furfural (158.8 g., 1.65 mole, 137 ml.) all at once. Upon refluxing the stirred solution for about 2½ hours almost the theoretical quantity of water was collected in the Dean-Stark trap. Most of the solvent was allowed to distill out (750 ml.) and the cooled residue was decanted away from a small quantity of polymeric residue on the sides of the flask. To this residue was added 500 ml. of hexane and the solution was chilled to −10° C., whereupon solids formed. Filtration while cold and air drying of the moist cake yielded the product as a tan granular solid (245 g.), m.p. 48–51° C. An additional 59 g. of product was obtained by further workup of the filtrate. IR (melt), 6.18μ, C=N.

NMR (CDCl$_3$), δ 2.14 (6H, s, CH$_3$), 6.48 (1H, q, γ-H), 6.95 (4H, m, Ar-H's and β-H), 7.55 (1H, d, δ-H), 7.96 (1H, s, C$\underline{\text{H}}$=N).

In the second step the intermediate imines produced as described hereinabove are reduced to the corresponding N-furfurylanilines. This is done generally by relatively mild reduction reactions such as by use of sodium borohydride in methanol or with sodium metal and alcohol. The tetrahydrofurfuryl analogs are obtained by more drastic catalytic hydrogenation techniques utilizing catalysts such as Raney nickel, PtO$_2$, Pd/C, Rh/C etc. In all cases the particular reduction technique employed is not a critical factor of this invention. The following Examples demonstrate the reduction reaction.

EXAMPLE 3

N-Furfuryl-o-toluidine (sodium borohydride method)

The procedure used is similar to that described by Billman and Diesing, J. Org. Chem., 22, pp. 1068–70 (1957).

N-Furfurylidene-o-toluidine (50.0 g., 0.2695 mole) was dissolved in absolute methanol (400 ml.) and sodium borohydride (11.2 g., 0.296 mole) was added portionwise with stirring over a period of 1½ hours. The temperature of the solution was maintained at 35–40° C., during the addition, but then raised to reflux for 1¼ hours. To the clear solution was added 500 ml. of water and the resulting oil was separated off and dissolved in ether. The ethereal solution was washed with water three or four times and then dried with anhydrous MgSO$_4$. Removal of solvent at reduced pressure gave the product as a clear red-orange oil (47. 7g.) which was homogeneous by GLPC. IR, 3μ, N-H, no C=N absorption at 6.17μ.

NMR, (CDCl$_3$), δ 2.10 (3H, s, CH$_3$), 3.67 (1H, broad, NH), 4.28 (2H, s, NCH$_2$), 6.14 (1H, d, β-H), 6.22 (1H, m, γ-H), 6.5–7.16 (4H, m, Ar-H's), 7.28 (1H, d, δ-H).

EXAMPLE 4

N-Furfuryl-2,6-dimethylaniline (sodium-alcohol method)

N-Furfurylidene-2,6-dimethylaniline (40 g., 0.20 mole) was dissolved in 100 ml. of absolute ethanol and to this stirred solution was added sodium metal (17.6 g., 0.76 mole) portionwise over a 2-3 hour time period.

The reaction slurry was stirred at ambient temperature overnight. Additional ethanol as well as sodium (13 g.) was added intermittently and the mixture was finally warmed slightly to aid the dissolution of sodium metal. The reaction was monitored by aliquot workup and observance of the infrared spectra for disappearance of the C=N absorption at 6.18μ and appearance of the N—H absorption at 3μ. Upon completion of the reaction, unreacted sodium metal was removed and water was added to the slurry. Most of the ethanol was removed on a steam bath under reduced pressure and the resulting oil was extracted into ether. This ethereal solution was washed with water (3 times), dried with magnesium sulfate and stripped to yield 33.6 g. of dark oil. The oil was vacuum distilled to give the product amine (24 g.), b.p. 88.5–89° C./0.2 mm. IR, 3μ, N—H, no C=N absorption at 6.18μ.

NMR (CDCl$_3$), δ 2.22 (6H, s, CH$_3$), 3.23 (1H, s, NH), 4.07 (2H, s, NCH$_2$), 6.01 (1H, d, β-H), 6.2 (1H, q, γ-H), 6.82 (3H, m, Ar-H's), 7.26 (1H, m, δ-H).

EXAMPLE 5

N-Tetrahydrofurfuryl-2,6-dimethylaniline (catalytic hydrogenation method)

A mixture of N-furfuryl-2,6-dimethylaniline (8.9 g., 0.044 mole) and 5% rhodium/charcoal catalyst (0.50 g.) in 120 ml. of absolute ethanol was hydrogenated in a Parr low pressure hydrogenation apparatus (initial pressure, 60 p.s.i.). The theoretical uptake of hydrogen was achieved in 30 minutes whereupon the catalyst was removed by filtration. Concentration of the filtrate followed by vacuum distillation gave 5.2 g. of the desired amine (b.p. 150–51° C./1.5 mm.) which was homogeneous by GLPC.

NMR (CDCl$_3$), δ 1.5–2.1 (4H, m, β-H's and δ-H's), 2.27 (6H, s, CH$_3$), 2.72–3.17 (2H, m, NCH$_2$), 3.43 (1H, s, NH), 3.65–4.1 (3H, m, δ-H's and α-H), 6.5–7.05 (3H, m, Ar-H's).

The final step in the synthesis of the herbicides of this invention involves conversion of the substituted anilines to the haloacetanilide. This is most feasibly done by reaction with chloroacetic (or bromoacetic) anhydride using well-known techniques for this reaction. The following examples demonstrate typical techniques involved.

EXAMPLE 6

2-Chloro-N-furfurylacetanilide

A solution of N-furfurylaniline (6.0 g., 0.0346 mole) in 50 ml. of benzene was added to a solution of chloroacetic anhydride (6.33 g., 0.037 mole) in 50 ml. of chloroform and the mixture refluxed for 15 hours. Cooling and workup of the solution by washing consecutively with 50 ml. portions of water, 5% HCl, and water again, gave a dark oily product. The oil was crystallized by trituration with cold petroleum ether. Recrystallization from an ether-petroleum mixture gave tan crystals (5.9 g.), m.p. 72–4° C. [IR (KBr), C=O, 6.05μ].

NMR (CDCl$_3$), δ 3.8 (2H, s, CH$_2$Cl), 4.85 (2H, s, CH$_2$N), 6.18 (2H, split d, β-H and γ-H), 6.9–7.6 (6H, m, Ar-H's and δ-H).

EXAMPLE 7

2-Chloro-N-fufuryl-2',6'-dimethylacetanilide

Chloroacetic anhydride (3.42 g., 0.02 mole dissolved in chloroform was added all at once to a solution of N-furfuryl-2,6-dimethylaniline (4.0 g., 0.0197 mole). A slight exotherm was noted and the mixture was refluxed for two hours. Workup as in Example 6 and recrystallization of the product from heptane gave a gray-white solid, m.p. 101–105° C.

NMR (CDCl$_3$), δ 1.99 (6H, s, CH$_3$), 3.64 (2H, s, CH$_2$Cl), 4.75 (2H, s, CH$_2$N), 6.2 (2H, m, β-H and γ-H), 7.08 (3H, m, Ar-H's), 7.23 (1H, m, δ-H).

EXAMPLE 8

2-Chloro-N-tetrahydrofufuryl-2',6'-dimethylacetanilide

A benzene solution of chloroacetic anhydride (4.27 g., 0.025 mole) and N-tetrahydrofurfuryl-2,6-dimethylaniline (4.5 g., 0.022 mole) was refluxed for six hours. The solution was cooled and washed with 10% HCl, saturated NaHCO$_3$ solution, and water. The solution was dried with MgSO$_4$ and then stripped under vacuum to give a viscous oil (6.3 g.) as the product. [IR (neat), C=O, 6.05μ].

NMR (CDCl$_3$), δ 1.42–2.1 (4H, m, β-H's and δ-H's), 2.25 (6H, d, CH$_3$), 3.3–4.2 (7H, m with superimposed s, CH$_2$Cl, CH$_2$N, α-H, and δ-H's), 7.1 (3H, m, Ar-H's).

EXAMPLE 9

2-Chloro-N-tetrahydrofurfuryl-o-isopropylacetanilide

An ethereal solution of N-tetrahydrofurfuryl-o-isopropylaniline (4.0 g., 0.01823 mole) and chloroacetic anhydride (3.42 g., 0.02 mole) was refluxed overnight. Workup of the reaction mixture in the usual manner gave a yellow oil which soon crystallized. Recrystallization from heptane yielded white platelets (4.0 g.), m.p. 78–79° C. [IR (neat oil before solidification), 6.04μ, C=O].

EXAMPLES 10 THROUGH 35

Using the methods described and demonstrated hereinbefore, the following compounds were prepared:

(10) 2-chloro-N-furfuryl-2'-ethylacetanilide
(11) 2-chloro-N-tetrahydrofurfuryl-o-acetotoluidide
(12) 2-chloro-N-furfuryl-2',6'-diethylacetanilide
(13) 2-chloro-N-furfuryl-o-acetotoluidide
(14) 2-chloro-N-furfuryl-2'-chloroacetanilide
(15) 2-chloro-N-furfuryl-2'-methylthioacetanilide
(16) 2-chloro-N-furfuryl-2'-isopropylacetanilide
(17) 2-chloro-N-furfuryl-3'-trifluoromethylacetanilide
(18) 2-chloro-N-furfuryl-2'-methyl-4'-methoxyacetanilide
(19) 2-chloro-N-tetrahydrofurfuryl-2'-methoxyacetanilide
(20) 2-chloro-N-tetrahydrofurfuryl-2'-ethylacetanilide
(21) 2-chloro-N-tetrahydrofurfuryl-2',4'-dimethylacetanilide
(22) 2-chloro-N-tetrahydrofurfuryl-2'-methyl-4'-chloroacetanilide
(23) 2-chloro-N-tetrahydrofurfuryl-2',4',6'-trimethylacetanilide
(24) 2-chloro-N-tetrahydrofurfuryl 2'-methyl-3'-chloroacetanilide
(25) 2-chloro-N-tetrahydrofurfuryl-2',6'-diisopropylacetanilide
(26) 2-chloro-N-furfuryl-2'-chloro-6'-methylacetanilide
(27) 2-chloro-N-furfuryl-2',5'-dimethylacetanilide
(28) 2-chloro-N-furfuryl-2',4'-dimethylacetanilide
(29) 2-chloro-N-furfuryl-3'-chloro-2'-methylacetanilide
(30) 2-chloro-N-furfuryl-2',4',6'-trimethylacetanilide
(31) 2-chloro-N-furfuryl-2'-t-butylacetanilide
(32) 2-chloro-N-furfuryl-4'-chloro-2'-methylacetanilide
(33) 2-chloro-N-furfuryl-2',6'-diisopropylacetanilide
(34) 2-chloro-N-furfuryl-2'-trifluoromethylacetanilide
(35) 2-chloro-N-furfuryl-2'-methyl-6'-t-butylacetanilide.

The compounds of this invention can be applied in various ways to achieve herbicidal action. They can be applied, per se, as solids or in vaporized form, but are preferably applied as the toxic components in herbicidal compositions comprising the compound and a carrier. The compositions can be applied as dusts, as liquid sprays, or as gas-propelled sprays and can contain, in addition to a carrier, additives such as emulsifying agents, binding agents, gases compressed to the liquid state, odorants, stabilizers, and the like. A wide variety of liquid and solid carriers can be used. Non-limiting examples of solid carriers include talc, bentonite, diatomaceous earth, pyrophyllite, fuller's earth, gypsum, flours derived from cotton seeds and nut shells, and various natural and synthetic clays having a pH not exceeding about 9.5. Non-limiting examples of liquid carriers include water, organic solvents such as alcohols, ketones, amides and esters; mineral oils such as kerosene, light oils, and medium oils, and vegetable oils, such as cottonseed oil.

In practice, herbicidal application is measured in terms of pounds of herbicide applied per acre. The compounds of this invention are effective herbicides when applied in herbicidal amounts, i.e., at rates between about 0.2 pounds and about 10 pounds per acre.

PRE-EMERGENCE HERBICIDAL EFFECTIVENESS

Method of propagating test species

| | |
|---|---|
| Crabgrass | Digitaria sanguinalis. |
| Johnson grass | Sorghum halepense. |
| Barnyard grass | Echinochloa crusgalli. |
| Amaranth pigweed | Amaranthus retroflexus. |
| Turnip | Brassica sp. |
| Cotton | Gossypium hirsutum var. DPL smooth leaf. |
| Corn | Zea mays var. Golden Bantam. |
| Bean | Phaseolus vulgaris var. Black Valentine. |

All crop and weed species are planted individually in 3" plastic pots containing potting soil. Four seeds of each of corn, cotton, and snapbeans are seeded to a depth equal to the diameter of the seed. All other species are surface seeded and sprinkled with screened soil in an amount sufficient to cover the seeds. Immediately after planting, all pots are watered by sub-irrigation in greenhouse trays. Pots for the pre-emergence phase are seeded one day before treatment.

Method of Treatment

Spray applications are made in a hood containing a movable belt and fixed spray nozzle. For passage through the spray hood, one pot of each species (pre-emergence phase) is placed on a wooden flat. Treatments are moved to the greenhouse after spraying. Watering during the observation period is applied only by sub-irrigation.

Compounds are screened initially at a rate of application equivalent to 0.5 to 10 pounds per acre. Two weeks after treatment the pre-emergence percent injury is visually rated.

Herbicidal testing of compounds of the examples showed the results set forth in the table. The plants are tabulated using the following abbreviations:

| | |
|---|---|
| Crabgrass | CG |
| Johnson grass | JG |
| Barnyard grass | BG |
| Pigweed | PW |
| Turnip | TP |
| Cotton | CT |
| Corn | CN |
| Bean | BN |

In the Table, spaces left blank indicate that the test compound was not tested on the plant species under which the blank space appears.

TABLE

| Compound of Example | Rate, lbs./acre | CG | JG | BG | PW | TP | CT | CN | BN |
|---|---|---|---|---|---|---|---|---|---|
| 6 | 8 | 20 | | | | 90 | | | |
| 13 | 10 | 90 | 0 | | 100 | | | | |
| 14 | 10 | 70 | 0 | | | 20 | | | |
| 7 | 4 | 90 | 80 | 90 | | 30 | 0 | 0 | |
| 7 | 2 | 80 | 40 | 90 | | 30 | 0 | 0 | 0 |
| 12 | 10 | 90 | 90 | | | 0 | | | |
| 15 | 2 | 0 | 0 | | | 0 | | | |
| 16 | 10 | 90 | 80 | | | 40 | | | |
| 8 | 10 | 90 | 80 | | | 50 | | | |
| 8 | 2 | 60 | 0 | 90 | | 40 | 20 | 30 | |
| 10 | 10 | 90 | | 90 | | 30 | | | |
| 11 | 10 | 80 | | 80 | | 0 | | | |
| 12 | 4 | 90 | | 90 | | 30 | 100 | 0 | 30 |
| 18 | 10 | 50 | | 60 | | 30 | | | |
| 19 | 4 | 0 | 0 | 0 | | 20 | | | |
| 20 | 10 | 40 | 30 | 50 | | 20 | | | |
| 26 | 4 | 90 | 0 | 80 | | 20 | 20 | 0 | |
| 26 | 2 | 70 | 30 | 50 | | 0 | 0 | 20 | |
| 21 | 4 | 0 | 20 | 20 | | 40 | 20 | 0 | |
| 27 | 4 | 80 | 40 | 90 | | 0 | 20 | 0 | |
| 27 | 2 | 40 | 40 | 40 | | 0 | 0 | 0 | |
| 32 | 4 | 0 | 0 | 20 | | 0 | 30 | 0 | |
| 22 | 4 | 20 | 0 | 0 | | 0 | 0 | 0 | |
| 33 | 4 | 90 | 30 | 50 | | 40 | 20 | 0 | |
| 34 | 4 | 30 | 30 | 60 | | 0 | 0 | 0 | |
| 35 | 4 | 90 | | 90 | | 20 | 20 | 0 | |
| 35 | 2 | 90 | 40 | 80 | | 70 | 30 | 20 | |
| 23 | 4 | 30 | 0 | 20 | | 20 | 0 | 0 | |
| 30 | 4 | 0 | 20 | 30 | | 0 | 0 | 0 | |
| 28 | 4 | 40 | 0 | 20 | | 0 | 0 | 0 | |
| 29 | 2 | 20 | 30 | 0 | | 40 | 20 | 0 | |
| 24 | 2 | 0 | 30 | 20 | | 60 | 20 | 20 | |
| 31 | 2 | 70 | 0 | 20 | | 50 | 30 | 30 | |
| 25 | 2 | 20 | 0 | 30 | | 30 | 0 | 30 | |
| 17 | 2 | 30 | 30 | 40 | | 20 | 0 | 20 | |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A compound having the formula:

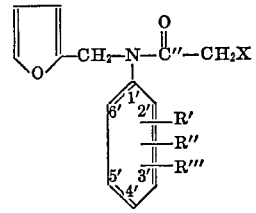

and the corresponding N-tetrahydrofurfuryl compounds, wherein X is halogen (Cl or Br) and R', R", and R''' are $C_1-C_6$ alkyl, $C_1-C_6$ alkoxy, $C_1-C_6$ alkylthio, haloacetyl, and trifluoromethyl; provided that when R', R" and R''' are mixed substituents they are nonadjacent.

2. A compound of Claim 1, wherein said compound is 2-chloro-N-furfuryl-2',6'-dimethylacetanilide.

3. A compound of Claim 1, wherein said compound is 2-chloro-N-furfuryl-2'-methyl-6'-t-butylacetanilide.

4. A compound of claim 1, wherein said compound is 2-chloro-N-tetrahydrofurfuryl-2',6'-dimethylacetanilide.

5. A compound of Claim 1, wherein said compound is 2-chloro-N-furfuryl-2',6'-diethylacetanilide.

6. A compound of Claim 1, wherein said compound is 2-chloro-N-furfuryl-2'-chloro-6'-methylacetanilide.

References Cited

UNITED STATES PATENTS 3,442,945   5/1969   Olin _____ 260—347.3
3,586,496   6/1971   Chupp _____ 71—88

OTHER REFERENCES

Hamm et al.: Agricultural and Food Chemistry, (1957), vol. 5, No. 1, pp. 30–32.

HENRY R. JILES, Primary Examiner

B. DENTZ, Assistant Examiner

U.S. Cl. X.R.

71—88; 260—347.7, 347.2, 347.5

UNITED STATES PATENT OFFICE
CERTIFICATE OF CORRECTION

Patent No. 3,819,661  Dated June 25, 1974

Inventor(s) Lester L. Maravetz

It is certified that error appears in the above-identified patent and that said Letters Patent are hereby corrected as shown below:

Column 3, line 31, "furfurylidene or" should read -- furfurylidene of --.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*